(12) United States Patent
Kolbeck et al.

(10) Patent No.: US 7,117,012 B1
(45) Date of Patent: Oct. 3, 2006

(54) METHOD FOR OPERATING A PORTABLE DATA CARRIER CONFIGURED FOR EXECUTING RELOADABLE FUNCTIONAL PROGRAMS

(75) Inventors: Alexander Kolbeck, Weilheim (DE); Thomas Stocker, Munich (DE); Thomas Frey, Ebersberg (DE); Dieter Weiss, Munich (DE); Martin Merck, Würzburg (DE)

(73) Assignee: Giesecke & Devrient GmbH, (DE)

( * ) Notice: Subject to any disclaimer, the term of this patent is extended or adjusted under 35 U.S.C. 154(b) by 324 days.

(21) Appl. No.: 09/926,792

(22) PCT Filed: Jun. 23, 2000

(86) PCT No.: PCT/EP00/05795

§ 371 (c)(1),
(2), (4) Date: Apr. 3, 2003

(87) PCT Pub. No.: WO01/01357

PCT Pub. Date: Jan. 4, 2001

(30) Foreign Application Priority Data

Jun. 25, 1999 (DE) .............................. 199 29 164

(51) Int. Cl.
*H04B 1/38* (2006.01)
*H04M 1/00* (2006.01)

(52) U.S. Cl. .................. 455/558; 455/418; 455/550.1; 455/556.1; 455/556.2; 455/559; 713/172

(58) Field of Classification Search ................ 455/418, 455/550.1, 556.1, 556.2, 559, 558; 235/492; 902/26; 713/172
See application file for complete search history.

(56) References Cited

U.S. PATENT DOCUMENTS

| | | | | |
|---|---|---|---|---|
| 5,293,424 A | * | 3/1994 | Holtey et al. | 713/193 |
| 5,802,519 A | * | 9/1998 | De Jong | 707/100 |
| 5,923,884 A | * | 7/1999 | Peyret et al. | 717/167 |
| 6,003,134 A | * | 12/1999 | Kuo et al. | 713/200 |
| 6,256,690 B1 | * | 7/2001 | Carper | 710/301 |
| 6,308,270 B1 | * | 10/2001 | Guthery | 713/200 |
| 6,330,648 B1 | * | 12/2001 | Wambach et al. | 711/163 |
| 6,493,550 B1 | * | 12/2002 | Raith | 455/422.1 |
| 6,575,372 B1 | * | 6/2003 | Everett et al. | 235/492 |

FOREIGN PATENT DOCUMENTS

| | | |
|---|---|---|
| CA | 2 275 931 | 7/1998 |
| DE | 197 23 676 A1 | 8/1998 |
| EP | 0 949 595 A2 | 10/1999 |

* cited by examiner

*Primary Examiner*—Steve M. D'Agosta
(74) *Attorney, Agent, or Firm*—Bacon & Thomas PLLC

(57) ABSTRACT

A method is proposed for operating a portable data carrier designed for executing reloadable function programs. According to the method the data carrier initially has installed thereon a loader interface which allows the reloading of load applications which in turn permit the loading of function programs. Each load application has allotted thereto an invariable assigned address space. To support the management of an assigned address space, badges are produced for application programs to be reloaded, said badges containing information about the size of the memory space required for the application program. Address space in the memory device is allotted to application programs to be reloaded in accordance with the size information provided on the badges. A data carrier suitable for carrying out said method is further disclosed.

12 Claims, 2 Drawing Sheets

METHOD FOR OPERATING A PORTABLE DATA CARRIER CONFIGURED FOR EXECUTING RELOADABLE FUNCTIONAL PROGRAMS

BACKGROUND

Data carriers in the form of smart cards are used in an increasing variety of application areas. Especially widespread cards are ones according to the standard ISO 7810 which consist of a plastic carrier incorporating an integrated semiconductor circuit and contact means for making electric connections with a corresponding reader. It has also been proposed to make the card carrier smaller or omit it completely and instead install for example a single-chip microcontroller in watches, jewelry, garments or other articles of daily use. The term "smart card" is therefore intended to include all current and future transportable (small) objects in which a microcontroller is embedded to enable its owner or holder to perform smart card-typical interactions with corresponding, specially provided interaction stations. Typical smart card applications are the credit card, money card, health insurance card or telephone card. The term "application" refers here to the totality of all data, commands, operations, states, mechanisms and algorithms within a smart card which are necessary for operating a smart card within a system, for example a credit card payment system.

Each application usually has its own corresponding smart card, and each new application and update of an existing application likewise yield a new smart card. It is therefore fundamentally desirable to have a smart card which can be used for a plurality of applications of different service providers and operators of card systems, such as credit card organizations, banks, insurances, telephone companies, etc.

A file organization for such a smart card suitable for several applications is shown in Rankl/Effing, "Handbuch der Chipkarten," Carl Hauser Verlag, 1996, chapter 5.6. The organization structure described therein is based on ISO/IEC standard 7816-4. At the top of the file structure is a master file containing the directories of all other files present on the smart card. Subordinate to the master file are one or more dedicated files containing the file names of files combined in groups, in particular belonging to one application. Subordinate to each dedicated file are finally one or more elementary files containing the useful data of an application. This print in addition describes the reloading of program code as technically possible but inexpedient for reasons of security. As the most promising measure for overcoming the security problems it refers to setting up a memory management unit which monitors program code to be executed as to whether it keeps to the allocated limits.

The print WO-A1-98/09257 discloses a system and method for loading applications onto a smart card which make it possible to put program and application data of further applications into a smart card in addition to the data of already loaded applications. Precautions are taken on the basis of suitable cryptographic technologies to allow verification of the authorization of the agency performing the data reloading. After the data of an additional application have entered the memory of the smart card, the authenticity of the corresponding program data is checked. Then the program data are checked with respect to their syntax and valid type limitations. If an incongruity is ascertained in one of these check steps, the additionally loaded data are discarded and deleted in the memory. The known system allows controlled reloading of applications after the card has been issued to the final user. However, it means that a card issuer issuing a smart card with available, free memory space to a service provider, for example, must already know the identity of all agencies of the service provider which are later to be entitled to offer applications to an end-user for reloading. This can be done by the card issuer certificating certain public signature keys of service providers in order to be able to do a check of the authenticity of reloaded data by depositing its own public signature key, e.g. in the ROM mask of the smart card. However, in the known system a card issuer has no possibility of checking the memory volume occupied by the service providers on a single smart card, beyond authenticity and correct syntax.

DE 197 18 115 A1 further discloses a smart card and method for loading data onto a smart card which make it possible to put card applications on a smart card after the end of the card production process. Provided on the smart card is a container storage space into which service providers can load applications of their own. In the container storage space the basic program structure of reloadable applications is predefined; what is reloaded is only dedicated data and keys. Predefinition of the structures of loadable applications achieves a reliable separation of data of different service providers on a card. This print does not provide for the reloading of applications with unknown data structure. It does not in general describe alternatives of predefining application structures for managing the container storage space. The concept of predefining application structures cannot be used if program code of indefinite scope is to be loaded onto a card later. The solution found in DE 197 18 115 A1 is therefore unsuitable for applying complete program codes of applications later.

SUMMARY

The invention is based on the problem of providing a method for putting an additional application on a smart card as well as a smart card which avoid the stated disadvantages of the prior art.

Inventive methods permit a card issuer in advantageous fashion to allow a user to put function programs into a card on his own authority later. The card issuer need no longer predefine which users or service providers are to be given permission to reload additional applications onto certain smart cards. It is instead possible to reload an application even when the smart card is already issued and in the user's possession. The method is therefore suitable in particular for realizing a contractual transfer of precisely definable rights to memory resources of smart cards to third parties by a smart card issuer.

The method ensures a high security standard. This is obtained by the fact that load applications permitting reloading of application function programs can only be put on the card via a main loader interface set up on the card by application-related cost system. For example, it may be provided to have a user or service provider pay a share of the total costs of a smart card depending on how much of the smart card memory device he or it occupies.

The badge system according to claim 8 offers the advantage that the card issuer can check the volume of memory space to be available to individual users for reloadable applications. The badge system in addition offers the possibility of setting up an application-related cost system. For example, it may be provided to have a user or service provider pay a share of the total costs of a smart card depending on how much of the smart card memory device he or it occupies.

The inventive methods and data carriers according to this application include advantageous developments and expedient embodiments that will become evident in the following discussion.

BRIEF DESCRIPTION OF THE DRAWINGS

The invention will be explained in more detail in the following by an embodiment by way of example and in nonlimiting fashion with reference to the drawings, in which.

DESCRIPTION OF VARIOUS EMBODIMENTS

Figure 1:
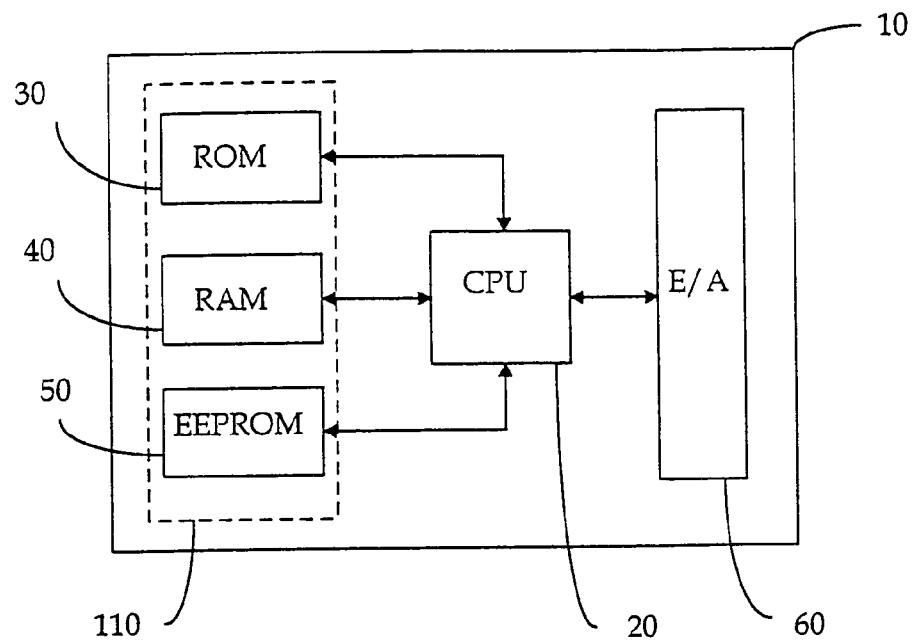
FIG. 1 shows the structure of a microprocessor smart card.

FIG. 1 shows the typical structure of smart card 10 equipped with a microprocessor. The main element is central processor unit 20 which gives smart card 10 its functionality by executing function programs. Processor unit 20 has assigned thereto memory device 110 constructed of three memory circuits 30, 40, 50. Memory circuit 30 represents a mask-programmed read-only memory (ROM) containing in particular the operating system of central processor unit 20; memory circuit 50 represents electrically erasable read-only memory 50 (EEPROM) for receiving the program codes of function programs and data used by central processor unit 20; memory circuit 40 represents normally volatile random access memory 40 (RAM) for use as a working memory in executing a function program. Card functionality results from the totality of the program codes or data contained in memory circuits 30, 40, 50. If this is technically necessary or expedient, memory circuits 30, 40, 50 can be used in overlapping fashion, e.g. if certain memory address areas in the EEPROM are used for program data of the operating system, or memory address areas in the ROM are occupied with application data. For this reason memory circuits 30, 40, 50 will always be understood in the following as a whole as memory device 110. For exchanging data with external devices, card 10 in addition has data interface 60 likewise connected with central processor unit 20. A typical application of card 10 shown is to execute electronic payment operations. A detailed description of the smart card shown in FIG. 1 can be found e.g. in Rankl/Effing, "Handbuch der Chipkarten," Carl Hauser Verlag, 1996, chapter 2.3.

Figure 2:
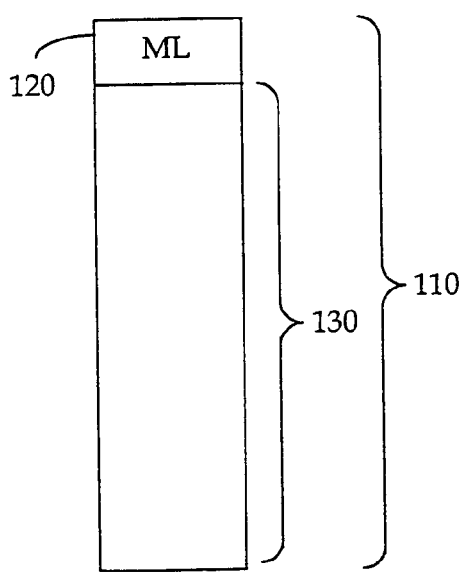
FIG. 2 shows schematically the occupancy of the memory device of a smart card with a main loader.

A first embodiment of the invention is based on the concept of allowing load applications which can in turn load application function programs to be put on a card but permitting the load applications themselves to be set up solely by a special loader interface. FIG. 2 illustrates schematically the occupancy of memory device 110 of a smart card which first includes only the program code of single function program 120 defining first loader interface 120. Loader interface 120 is specially designed to reload into memory device 110 function programs which realize load applications, i.e. which in turn have load functionality and permit reloading of application function programs. Loader interface 120 is expediently part of the basic equipment of a smart card and is put on the card by the card issuer or card producer. Loader interface 120, designated main loader (HL) in the following, occupies part of the total memory area available in memory device 110. The function program realizing main loader 120 can in particular be part of the operating system of the smart card and is accordingly executed as part of the mask-programmed code in read-only memory (ROM) 30. Another part of the total memory area is initially not occupied with data and is available as free memory 130 for further function programs yet to be loaded. Management of total free memory 130 is effected first by main loader 120. In this function as a management device, main loader 120 controls in particular the loading of the program code of the first function program to be reloaded into free memory 130 and the allocation of address spaces. The byte code of the first as well as all other reloaded function programs is transmitted via data interface 60 in the form of suitable electric signals.

Main loader 120 preferably loads only those function programs into memory device 110 which fulfill defined security conditions. During loading it thus preferably checks integrity and authenticity of a load application to be loaded by checking whether the program code waiting to be loaded is present unchanged in a form approved by the producer, or whether the producer of a load application is actually authorized to put in the load application by for example having acquired a right to utilize smart card resources from the card issuer.

Figure 3:
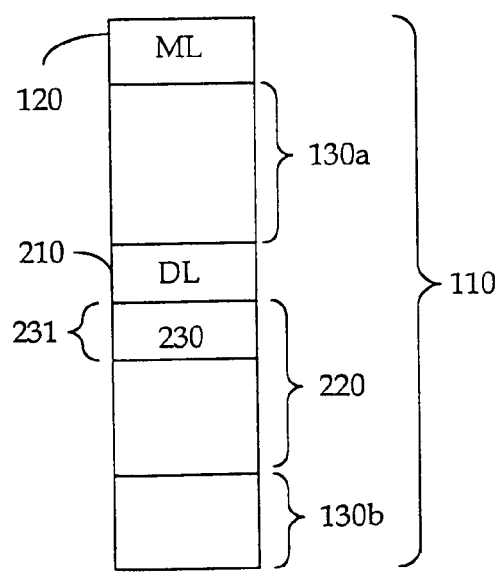
FIG. 3 shows the occupancy of the memory device after loading of a special loader.

FIG. 3 shows the memory array from FIG. 2, whereby main loader 120 has now loaded first function program 210 realizing a load application into free memory 130. Load application 210 defines a second interface, designated special loader 210 (DL) in the following. It allows further function programs to be put into memory device 110 subsequently. However, it only has defined, unexpandable assigned address space 220 available therefor. Assigned address space 220 is allotted to special loader 210 by main loader 120 during loading of special loader 210. Said allocation transfers the management of assigned address space 220 completely to special loader 210, which has the necessary functionality as a management device for this purpose like main loader 120. Main loader 120 has no influence on, or access to, the further utilization of address space 220 assigned to special loader 210.

Main loader 120 still has management of the part of the free memory address space not occupied by being taken over by special loaders 210 and assignment of address spaces 220 and fragmented into separate sections 130a, 130b.

Special loader 210 can be loaded by the user of a card, unlike main loader 120. Special loader 210 permits, and is the precondition for, the user to load function programs realizing applications into assigned address space 220 subsequently as he chooses. The term "application" refers here to the totality of all data, commands, operations, states, mechanisms and algorithms for operating a smart card which is application-related cost system. For example, it may be provided to have a user or service provider pay a share of the total costs of a smart card depending on how much of the smart card memory device he or it occupies.

Advantageous developments and expedient embodiments of the proposed method and smart card can be found in the dependent claims.

Figure 4:
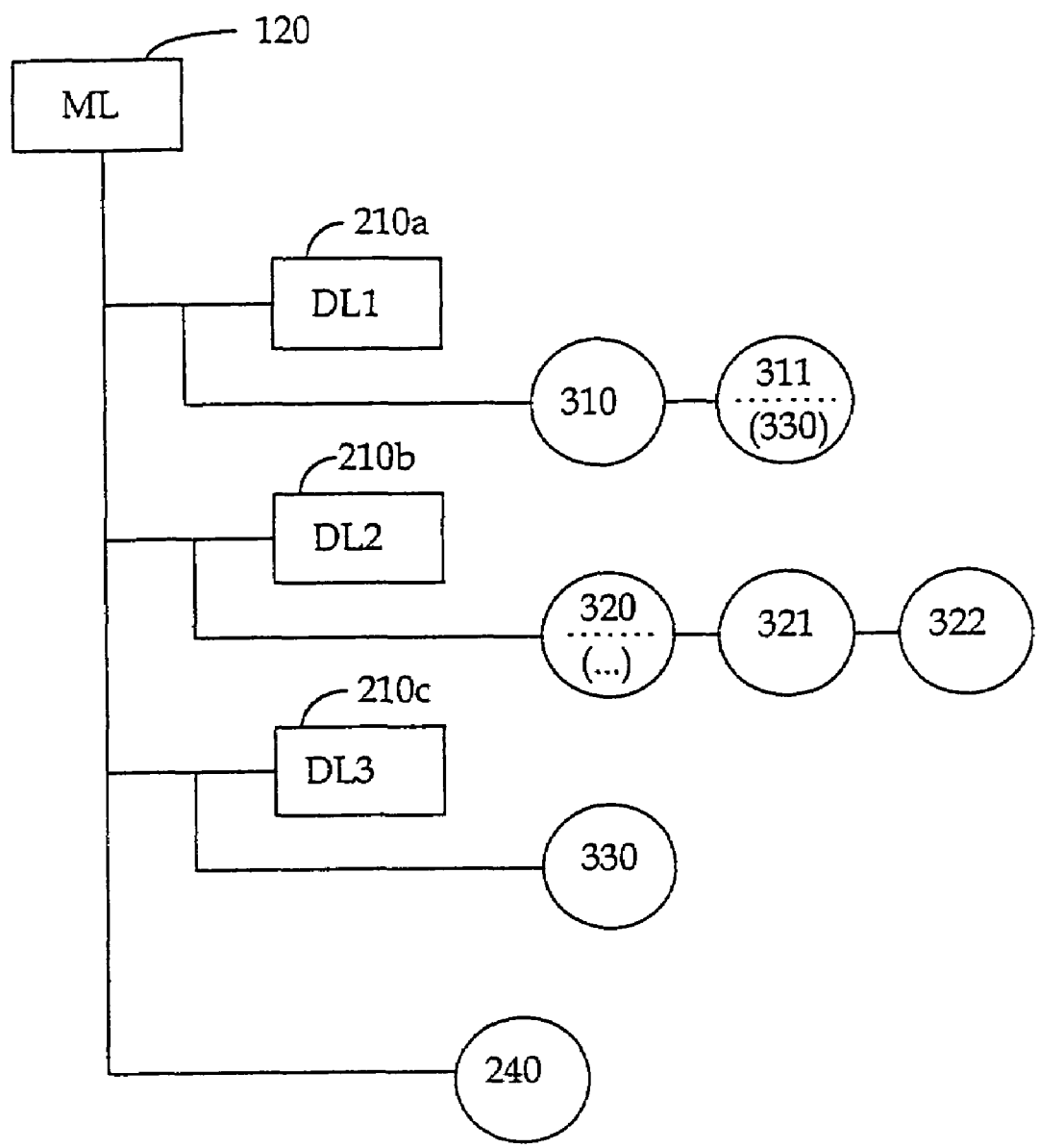
FIG. 4 shows a schematic view of the hierarchical structure comprising a main loader and several special loaders.

The invention will be explained in more detail in the following by an embodiment by way of example and in nonlimiting fashion with reference to the drawing, in which:

FIG. 1 shows the structure of a microprocessor smart card,

FIG. 2 shows schematically the occupancy of the memory device of a smart card with a main loader, FIG. 3 shows the occupancy of the memory device after loading of a special loader, FIG. 4 shows a schematic view of the hierarchical structure comprising a main loader and several special loaders.

FIG. 1 shows the typical structure of smart card 10 equipped with a microprocessor. The main element is central processor unit 20 which gives smart card 10 its functionality by executing function programs. Processor unit 20 has assigned thereto memory device 110 constructed of three memory circuits 30, 40, 50. Memory circuit 30 represents a mask-programmed read-only memory (ROM) containing in particular the operating system of central processor unit 20; memory circuit 50 represents electrically erasable read-only memory 50 (EEPROM) for receiving the program codes of function programs and data used by central processor unit 20; memory circuit 40 represents normally volatile random access memory 40 (RAM) for use as a working memory in executing a function program. Card functionality results from the totality of the program codes or data contained in memory circuits 30, 40, 50. If this is technically necessary or expedient, memory circuits 30, 40, 50 can be used in overlapping fashion, e.g. if certain memory address areas in the EEPROM are used for program data of the operating system, or memory address areas in the ROM are occupied with application data. For this reason memory circuits 30, 40, 50 will always be understood in the following as a whole as memory device 110. For exchanging data with external devices, card 10 in addition has communication device 60 likewise connected with central processor unit 20. A typical application of card 10 shown is to execute electronic payment operations. A detailed description of the smart card shown in FIG. 1 can be found e.g. in Rankl/Effing, "Handbuch der Chipkarten," Carl Hauser Verlag, 1996, chapter 2.3.

A first embodiment of the invention is based on the concept of allowing load applications which can in turn load application function programs to be put on a card but permitting the load applications themselves to be set up solely by a special loader interface. FIG. 2 illustrates schematically the occupancy of memory device 110 of a smart card which first includes only the program code of single function program 120 defining first loader interface 120. Loader interface 120 is specially designed to reload into memory device 110 function programs which realize load applications, i.e. which in turn have load functionality and permit reloading of application function programs. Loader interface 120 is expediently part of the basic equipment of a smart card and is put on the card by the card issuer or card producer. Loader interface 120, designated main loader (ML) in the following, occupies part of the total memory area available in memory device 110. The function program realizing main loader 120 can in particular be part of the operating system of the smart card and is accordingly executed as part of the mask-programmed code in read-only memory (ROM) 30. Another part of the total memory area is initially not occupied with data and is available as free memory 130 for further function programs yet to be loaded. Management of total free memory 130 is effected first by main loader 120. In this function as a management device, main loader 120 controls in particular the loading of the program code of the first function program to be reloaded into free memory 130 and the allocation of address spaces. The byte code of the first as well as all other reloaded function programs is transmitted via data interface 60 in the form of suitable electric signals.

Main loader 120 preferably loads only those function programs into memory device 110 which fulfill defined security conditions. During loading it thus preferably checks integrity and authenticity of a load application to be loaded by checking whether the program code waiting to be loaded is present unchanged in a form approved by the producer, or whether the producer of a load application is actually authorized to put in the load application by for example having acquired a right to utilize smart card resources from the card issuer.

On the other hand, function program 330 has no possibility of access or linking with respect to function programs 311; this is blocked due to a lack of corresponding access or linking permission for function program 330, or 320, this is blocked for all external access.

Complementary to the loading of new function programs by main loader 120 or special loader 210, it is fundamentally also possible to delete function programs 210, 240, 310, 330 present in memory device 110. Entitlement to deletion is set up during loading of a function program by loader 120, 210. Deletion of special loader 210 is only possible if address space 220 assigned thereto no longer contains any function program. Main loader 120 cannot be deleted.

A measure which advantageously supports low-risk transfer of smart card memory space to third parties is the use of a badge system for carrying out the storage space allocation by main loaders 120 and/or special loaders 210*a*, 210*b*, 210*c*. The badges have the form of digital information. They are added to special loader 210 or a function program to be loaded and comprise in particular a statement about the size of desired assigned address space 220 or the size of address space 230 required for the function program therein. Loader 120, 210 to be used for loading a special loader or function program 230 provided with a badge must be capable of evaluating the badge. A badge system can be set up for all loaders 120, 210 of a card or only for individual ones; a hierarchical loader structure as shown in FIG. 3 is not a precondition for setting it up. The badges are generated by the smart card issuer or the producer of loader 120, 210. They must also be acquired beforehand from said issuer or producer for special loader 210 to be newly loaded or a function program to be newly loaded into memory device 110. The loader producer/card issuer is in this way always informed of the occupancy of the address space assigned to its loader 120/210. By assigning only the absolutely necessary address space to special loaders or function programs to be newly loaded, it can ensure particularly memory space-saving utilization of an assigned address space by means of corresponding information on the badge.

Besides mere size information, a badge can contain further information, for example information permitting a check of the authenticity of a badge. Authenticity and forgery-proofness of a badge are further preferably ensured by cryptographic methods. The information on a badge is in this case encrypted, the badge accordingly containing for example an initialization key which allows an authorized loader to derive a key for reading the badge. Expediently, a badge further contains a cryptographically realized digital signature. To facilitate management, a badge can in addition be provided with for example the designation of a function program, an application identifier, a date or the like. It is furthermore possible to set up information which limits the usability of a function program, limiting for example the time for which an application can be used, or stating identifiers of cards which are solely entitled to use a function program.

The invention claimed is:

1. A method for operating a data carrier equipped with a communication device, a memory device and a program execution unit for executing function programs contained in the memory device, comprising the steps:
   installing a function program in the memory device of the data carrier for realizing a loader interface which in turn makes it possible to reload function programs each realizing a load application,
   providing a free memory space available for the loader interface in the memory device,
   reloading at least one load application via the communication device into the memory device, said reloading being controlled by the loader interface, and the load application being allotted a part of the free memory space as an assigned address space;
   wherein the loader interface transfers the management of an assigned address space completely to a load application after the load application is assigned to the assigned address space, such that the loader interface has no further influence on or access to the assigned address space; and
   wherein the load application is configured to load at least one application program into said assigned address space.

2. The method according to claim 1, comprising the following further step:
   reloading at least one application program via the communication device by the program execution unit under the control of the load application into the assigned address space allotted thereto.

3. The method according to claim 1, wherein the loader interface provides control over an assigned address space allotted to a load application to the load application.

4. A data carrier comprising
   a memory device for receiving function and application programs,
   a program execution unit for executing function programs contained in the memory device,
   a communication device,
   a loader interface comprising a function program for loading at least one load application, which permits the reloading of a further application program, into the memory device via the communication device,
   the loader interface having associated therewith in the memory device a free memory space for receiving at least one load application;
   wherein the loader interface transfers the management of an assigned address space completely to a load application after the load application is assigned to the assigned address space, such that the loader interface has no further influence on or access to the assigned address space.

5. The data carrier according to claim 4, including a load application received in the memory device that controls a part of the free memory space associated with the loader interface, independently of the loader interface.

6. The data carrier according to claim 4, wherein the load applications are designed to link application programs to be reloaded with application and function programs already present on the data carrier, during loading.

7. The data carrier according to claim 6, wherein a load application comprises limitations which prohibit the linking of an application program to be newly loaded with one already present.

8. A method for operating a data carrier having a memory device for receiving function and application programs, a program execution unit for executing function and application programs contained in the memory device, and a communication device, comprising the steps:
   equipping the data carrier with a function program comprising a loader interface for reloading application programs into the memory device,
   equipping the data carrier with a management device for assigning address spaces in the memory device to reloaded application programs,
   providing the application program to be reloaded with badges containing information about the size of the memory space required for the application program,
   evaluating the badge during reloading of an application program, and
   assigning to the application program an address space in the memory device coordinated with the determined size information;
   wherein the loader interface transfers the management of an assigned address space completely to a load application after the load application is assigned to the assigned address space, such that the loader interface has no further influence on or access to the assigned address space.

9. The method according to claim 8, wherein the badge furthermore contains information designating the application program.

10. The method according to claim 8, wherein the badge furthermore contains a signature for providing the authenticity of the application program.

11. The method according to claim 8, wherein the badges are issued by the issuer of the data carrier.

12. A data carrier comprising a memory device for receiving function and application programs, a program execution unit for executing function programs contained in the memory device, a communication device, and a loader interface comprising a function program, for reloading at least one application program into the memory device via the communication device, the loader interface having means for checking a badge of an application program to be loaded, and assigning memory space in the memory device to an application program to be loaded in accordance with size information contained on the badge;
   wherein the loader interface transfers the management of an assigned address space completely to a load application after the load application is assigned to the assigned address space, such that the loader interface has no further influence on or access to the assigned address space.

* * * * *